(12) United States Patent
Kang (10) Patent No.: US 10,769,612 B2
(45) Date of Patent: Sep. 8, 2020

(54) SYSTEM AND METHOD FOR CUSTOMERS INITIATED PAYMENT TRANSACTION USING CUSTOMER'S MOBILE DEVICE AND CARD (71) Applicant: Soo Hyang Kang, Brea, CA (US)

(72) Inventor: Soo Hyang Kang, Brea, CA (US)

( * ) Notice: Subject to any disclaimer, the term of this patent is extended or adjusted under 35 U.S.C. 154(b) by 0 days.

(21) Appl. No.: 15/703,841

(22) Filed: Sep. 13, 2017

(65) Prior Publication Data
US 2018/0189765 A1 Jul. 5, 2018

Related U.S. Application Data (63) Continuation-in-part of application No. 15/679,072, filed on Aug. 16, 2017, which is a (Continued)

(30) Foreign Application Priority Data

Jan. 3, 2017 (KR) .................. 10-2017-0000669

(51) Int. Cl.
G06K 7/08 (2006.01)
G06Q 20/22 (2012.01)
G06Q 40/00 (2012.01)
G06Q 30/06 (2012.01)
G06Q 20/34 (2012.01)
H04W 4/80 (2018.01)
(Continued)

(52) U.S. Cl.
CPC ....... *G06Q 20/227* (2013.01); *G06Q 20/3255* (2013.01); *G06Q 20/3278* (2013.01); *G06Q 20/341* (2013.01); *G06Q 20/352* (2013.01); *G06Q 20/3674* (2013.01); *G06Q 20/4097* (2013.01); *G06Q 30/0233* (2013.01); *G06Q 30/06* (2013.01); *G06Q 40/00* (2013.01); *H04W 4/80* (2018.02)

(58) Field of Classification Search
CPC ..... G06Q 30/06; G06Q 30/0601; G06Q 20/20
USPC .................. 235/451, 383, 385, 492, 472.02
See application file for complete search history.

(56) References Cited

U.S. PATENT DOCUMENTS 9,648,451 B1    5/2017 Lee
9,760,871 B1 *  9/2017 Pourfallah ............. G06Q 50/22
(Continued)

FOREIGN PATENT DOCUMENTS

WO    WO9849658 A1    11/1998
WO    WO2017000061 A1    1/2017
WO    WO2017021757 A1    2/2017

*Primary Examiner* — Daniel St Cyr
(74) *Attorney, Agent, or Firm* — Heedong Chae; Lucem, PC (57) ABSTRACT A system for a customer initiated payment transaction includes a mobile device of a customer, a card of the customer having card information, and a merchant having merchant information and payment information. The mobile device is operative to process a card payment transaction by the steps of, the mobile device: receiving the merchant information and the payment information; being activated, for processing the card payment transaction, by the card; creating a payment authorization, request using the card information, the merchant information, and the payment information, and sending the payment authorization request to an acquirer; and receiving a result of the payment authorization request from the acquirer.

13 Claims, 8 Drawing Sheets

Related U.S. Application Data continuation-in-part of application No. 15/665,333, filed on Jul. 31, 2017, application No. 15/703,841, which is a continuation-in-part of application No. 15/605,808, filed on May 25, 2017.

(51) Int. Cl.
*G06Q 20/32* (2012.01)
*G06Q 20/36* (2012.01)
*G06Q 20/40* (2012.01)
*G06Q 30/02* (2012.01)

(56) References Cited

U.S. PATENT DOCUMENTS

| | | | |
|---|---|---|---|
| 2011/0218871 A1* | 9/2011 | Singh | G06Q 20/10 705/17 |
| 2012/0150669 A1* | 6/2012 | Langley | G06Q 30/0601 705/16 |
| 2013/0097078 A1 | 4/2013 | Wong et al. | |
| 2014/0108166 A1* | 4/2014 | Murphy | G06Q 30/06 705/16 |
| 2014/0136350 A1 | 5/2014 | Savolainen | |
| 2014/0263627 A1 | 9/2014 | Wyatt | |
| 2015/0186871 A1* | 7/2015 | Laracey | G06Q 20/3278 705/41 |
| 2016/0267486 A1 | 9/2016 | Mitra et al. | |

\* cited by examiner

SYSTEM AND METHOD FOR CUSTOMERS INITIATED PAYMENT TRANSACTION USING CUSTOMER'S MOBILE DEVICE AND CARD

CROSS-REFERENCE TO RELATED APPLICATIONS

This application is a continuation-in-part application of and claims priority to U.S. patent application Ser. No. 15/605,808, entitled "Method, for Activating Multi-Function Device Card", filed May 25, 2017, which claims priority to Korean patent application no. 10-2017-0000669 filed on Jan. 3, 2017, and U.S. patent application Ser. No. 15/679,072, entitled "System and Method for Integrated Management of Loyalty Points", filed Aug. 16, 2017, which is a continuation-in-part of U.S. patent application Ser. No. 15/665,333 filed on Jul. 31, 2017, the disclosures of which are incorporated herein in their entirety by reference.

FIELD OF THE INVENTION

The present indention relates to a system and method for a customer initiated payment transaction using customer's mobile device and card, and, more particularly, to a system, and method for a card payment transaction initiated by a customer on behalf of a merchant using the customer's mobile device and card. The card may be a credit/debit card, a point card, a multi-function device (MFD) card, or a near field communication (NFC) card, and the mobile device communicates with the card via near-field communication, Bluetooth (Trademark), or the likes.

BACKGROUND OF THE INVENTION

Figure 1:
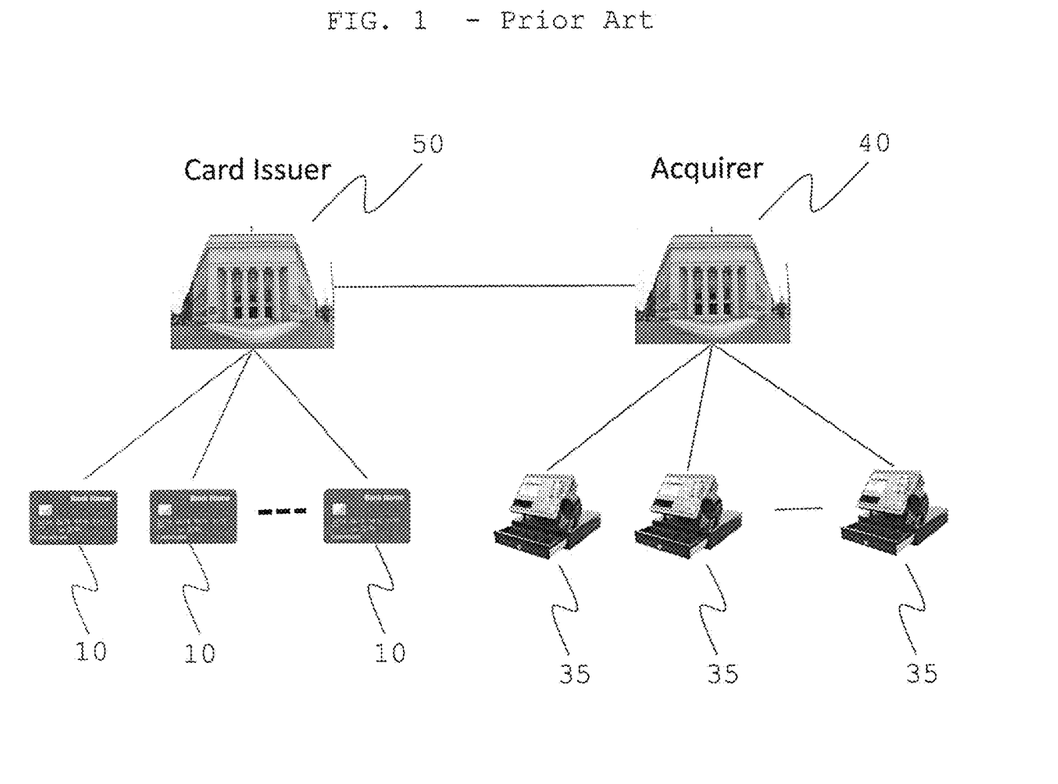
FIG. 1 is a schematic illustration of a conventional card payment transaction.
Figure 2:
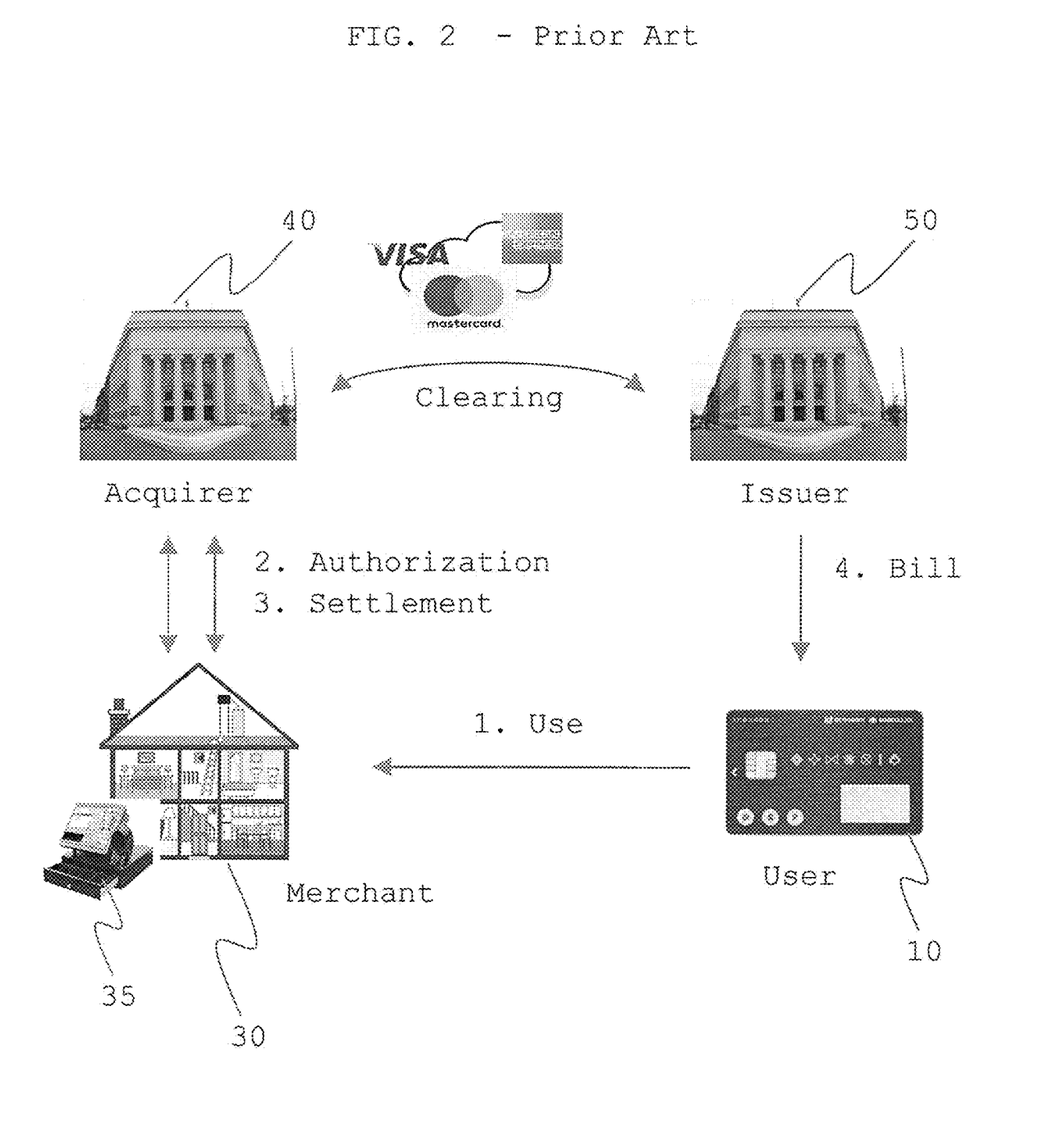
FIG. 2 is another schematic illustration of a conventional card payment transaction.

Payment cards (hereinafter "cards" or "card") are widely used by millions of people around the world to facilitate payments by electronic funds transfers. Payment cards may be a credit card, debit card, point card, multi-function device (MFD) card, near field communication (NFC) card, and so forth. A consumer may make a payment using his card to purchase a product or service from a merchant. In a typical case of purchase at a merchant's physical location as shown in FIGS. 1 and 2, the customer has to present his card at a point of sale (POS) terminal located at the merchant's place of business. The card is inserted or swiped through the POS terminal. Alternatively, the required card information may be entered or the POS terminal accepts near field communication contactless transactions and the card information is saved in the POS terminal. Once the card information is received and saved, the POS terminal transmits it to the acquirer for approval of the transaction along with the merchant information, such as a merchant code, and the transaction information, such as the payment amount and currency. The POS terminal transmits such information to the acquirer through the wired or wireless Internet or the standard telephone line. The acquirer communicates with the issuer as part of the approval process, where the issuer is the entity that issued the card to the consumer.

Here, an acquirer is usually a business entity such as a bank that has a pre-existing business relationship with a merchant. An issuer is usually a business entity such as a bank that issues a card to a consumer. The approval of the payment transaction or clearance and settlement thereof may involve communication between the acquirer and the issuer. The acquirer and/or issuer either approves or denies the payment transaction, and transfers such decision back to the POS terminal.

However, a customer's card information is transferred to a merchant's POS terminal and thus, there is a risk of the customer's card Information being stolen. Additionally, if the merchant does not have a POS terminal or the POS terminal does not work, the customer cannot make a payment using his card.

Mobile devices such as a cellular phones, mobile phones, smart phones, tablet computing devices, personal digital assistants (PDAs), or the like, are becoming popular and being widely used as payment devices. The mobile device typically permits a device owner to make a payment, for a merchant's goods or services. The mobile device may be linked to the device owner's payment account or the device owner's card information may be stored in the mobile device.

However, if the mobile device is stolen, the user of the mobile device may have access to the device owner's payment account or card information and be able to make payments without the device owner's approval.

A number of new payment systems have been introduced. Such systems typically utilize servers or management systems to manage the new payment transaction processes and databases. However, most systems drastically change existing payment transaction systems which makes it very expensive to implement and not practical.

Therefore, in order to overcome these disadvantages and shortcomings, there is a need for a system and method for a customer initiated payment transaction using a customer's mobile device and card. This invention is directed to address the above, problems and satisfy a long-felt need.

SUMMARY OF THE INVENTION

The present invention contrives to solve the disadvantages and shortcomings of the prior art by providing a system and method for customer initiated payment transactions using a customer's mobile device and card.

The object of the invention is to provide a system for a customer initiated payment transaction, which includes a mobile device of a customer, a card of the customer having card information, and a merchant having merchant information and payment information. The card may be a credit card, debit card, point card, multi-function device (MFD) card, near field communication (NFC) card, and so forth, and the card information may include a card number, an expiration date, an EMV parameter, a card name, user information, card verification value, password, etc. The merchant information may include a merchant code assigned to the merchant for card transactions with an acquirer, POS terminal parameter, etc., and the payment information may include the payment, amount for goods or services provided to the customer, currency, transaction identification, etc.

The mobile device is operative to process a card payment transaction by the steps of, the mobile device: receiving the merchant information and the payment information; being activated, for processing the card payment transaction, by the card; creating a payment authorization request using the card information, the merchant information, and the payment information, and sending the payment authorization request to an acquirer; and receiving a result of the payment authorization request from the acquirer.

Preferably, the card is a multi-function device (MFD) card or a near field communication (NFC) card having an antenna for near field communication (NFC), and the mobile device includes an NFC sensor. The mobile device is activated for processing the card payment transaction via NFC between the card and the mobile device, and the mobile device receives the card information from the card via NFC between the card and the mobile device.

The card number or the card information is not stored in the mobile device before the step of the mobile device being activated. Furthermore, the steps also include the mobile device deleting the card number or the card information after sending the payment authorization request to the acquirer.

The mobile device receives the merchant information or the payment information by: wireless communication from the merchant; tapping the mobile device to an NFC tag of the merchant which stores the merchant information; or typing the merchant information to the mobile device. The merchant may generate and transmit to the mobile device quick response (QR) code or bar code for the merchant information or the payment information.

Alternatively, the system may utilize a server having a database which stores the merchant information. The mobile device may obtain geolocation data of the merchant using a global positioning sensor of the mobile device and sends the geolocation data to the server, and in response, the server may search for and retrieve the merchant information corresponding to the geolocation data and send the merchant information to the mobile device.

Another object of the invention is to provide a system for a customer initiated payment transaction where the customer makes a payment by his integrated loyalty points. The system includes a mobile device of a customer, a card of the customer having information on integrated loyalty points; and a merchant who subscribes to accept integrated loyalty points as a payment method. The information on the integrated loyalty points includes customer identification and the amount of the integrated loyalty points owned by the customer.

The mobile device is operative to process a payment transaction using the integrated loyalty points of the customer by the steps of, the mobile device receiving the merchant information and the payment information; being activated, for processing the payment transaction, by the card; creating a payment authorization request using the information on the integrated loyalty points, the merchant information, and the payment information, and sending the payment authorization request to an acquirer for the integrated loyalty points; and receiving a result of the payment authorization request from the acquirer.

Preferably, the information on the integrated loyalty points is not stored in the mobile device before the step of the mobile device being activated. In addition, the steps further include the mobile device deleting the information on the integrated loyalty points after sending the payment authorization request to the acquirer.

Still another object of the invention is to provide a method for a customer initiated payment transaction using the customer's card. The method includes the steps of the customer's mobile device: receiving the merchant information and the payment information; being activated, for processing a card payment transaction, by the customer's card; creating a payment authorization request using card information, the merchant information, and the payment information, and sending the payment authorization request to an acquirer; and receiving a result of the payment authorization request from the acquirer. The method further includes the step of the mobile device deleting the card information after sending the payment authorization request to the acquirer.

Still another object of the invention is to provide a method for a customer initiated payment transaction using the customer's integrated loyalty points which are stored in the customer's card. The method includes the steps of the customer's mobile device: receiving the merchant information and the payment information; being activated, for processing the payment transaction, by the card; creating a payment authorization request using the information on the integrated loyalty points, the merchant information, and the payment information, and sending the payment authorization request to an acquirer for the integrated loyalty points; and receiving a result of the payment authorization request from the acquirer. The method further includes the step of the mobile device deleting the information on the integrated loyalty points after sending the payment authorization request to the acquirer.

The advantages of the present invention are: (1) a customer's payment transaction is possible even with the merchant's POS terminal or when the POS terminal does not work; (2) sensitive customer's card information does not have to be transmitted to a merchant; (3) both customer's mobile device and card are necessary for a payment transaction, and the mobile device does not store the card information, resulting in increased security; (4) merchants do not have to pay expensive card processing fees and the payment process becomes simplified; (5) the system of the present invention can get rid of the necessity of merchant POS terminals; (6) various cards such as debit/credit cards or loyalty point cards can be used as a payment method; (7) the system of the present invention utilizes pre-existing systems and does not drastically change such pre-existing systems, and thus it is easy to implement, effective, and cost-saving; (8) the system of the present invention minimizes the impact to the existing payment processes and infrastructures such as the Europay (Trademark), Mastercard (Trademark) and Visa (Trademark; collectively EMV) standard; (9) a customer's mobile device plays the role of the merchant's POS terminal and thus, the customer's card information does not have to be disclosed to the merchant; (10) under the system of the present invention, security has been improved because the customer needs his card and mobile device to make a card payment and the mobile device does not store the card information except when it processes a payment request; and (11) the system of the present invention provides even more improved security when the card is an MDF or NFC card and activated by the mobile device because even if the card is lost or stolen, it cannot be used unless activated by the mobile device.

Although the present Invention is briefly summarized, the fuller understanding of the invention can be obtained by the following drawings, detailed description, and appended claims.

BRIEF DESCRIPTION OF THE DRAWINGS

These and other features, aspects, and advantages of the present invention will become better understood with reference to the accompanying drawings, wherein.

DETAILED DESCRIPTION OF THE EMBODIMENTS OF THE INVENTION

Reference will now be made in detail to the preferred embodiments of the present invention, examples of which are illustrated in the accompanying drawings, which form a part of this disclosure. It is to be understood that this invention Is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations by use of the word "about", it will be understood that the particular value forms another embodiment.

FIGS. 1 and 2 illustrate a conventional payment system using a merchant's point of sale (POS) terminal 35 and a customer's card 10 such as a credit/debit card, a point card, a loyalty point card, a multi-function device (MFD) card, a near field communication (NFC) card, digital card, dual interface card or radio frequency (RF) card, or the likes.

A consumer may make a payment using his card 10 to purchase a product or service from a merchant. The customer presents his card 10 at a point of sale (PCS) terminal 35 located at a merchant's place of business 30. The card 10 is inserted or swiped through the POS terminal 35. Alternatively, the required card information may be entered or the POS terminal 35 may accept near field communication contactless transactions from the card 10. The card information is then saved in the POS terminal. Once the card information is received and saved, the POS terminal 35 transmits it to the acquirer 40 for approval of the transaction along with the merchant information, such as a merchant code, and the transaction information, such as the payment amount and currency. The merchant code is an identification assigned to the merchant for card transaction. The POS terminal 35 transmits such information to the acquirer 40 through the wired or wireless Internet or the standard telephone line. The acquirer 40 communicates with the issuer 50 as part of the approval process, where the issuer 50 is the entity that issued the card 10 to the consumer.

Here, an acquirer 40 is usually a business entity such as a commercial bank that has a pre-existing business relationship with a merchant and an issuer 50 is usually a business entity such as a bank that issues a card 10 to a consumer. The approval of the payment transaction or clearance and settlement thereof may involve communication between the acquirer 40 and the issuer 50. The acquirer and/or issuer either approves or denies the payment transaction, and transfers such decision back to the POS terminal 35.

Figure 3:
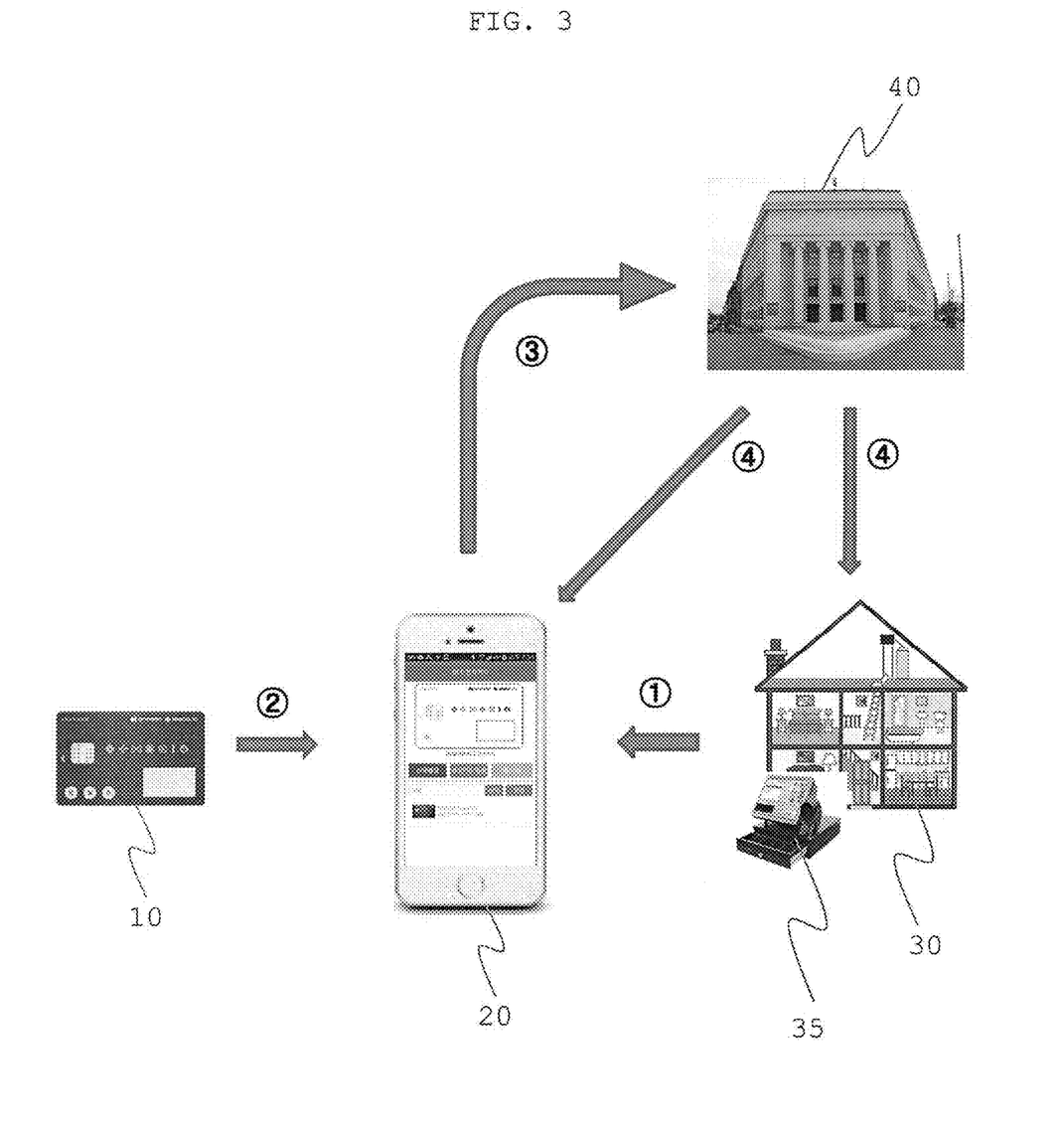
FIG. 3 is a schematic illustration of a card payment transaction using customer's mobile device and card according to the present invention.
Figure 4:
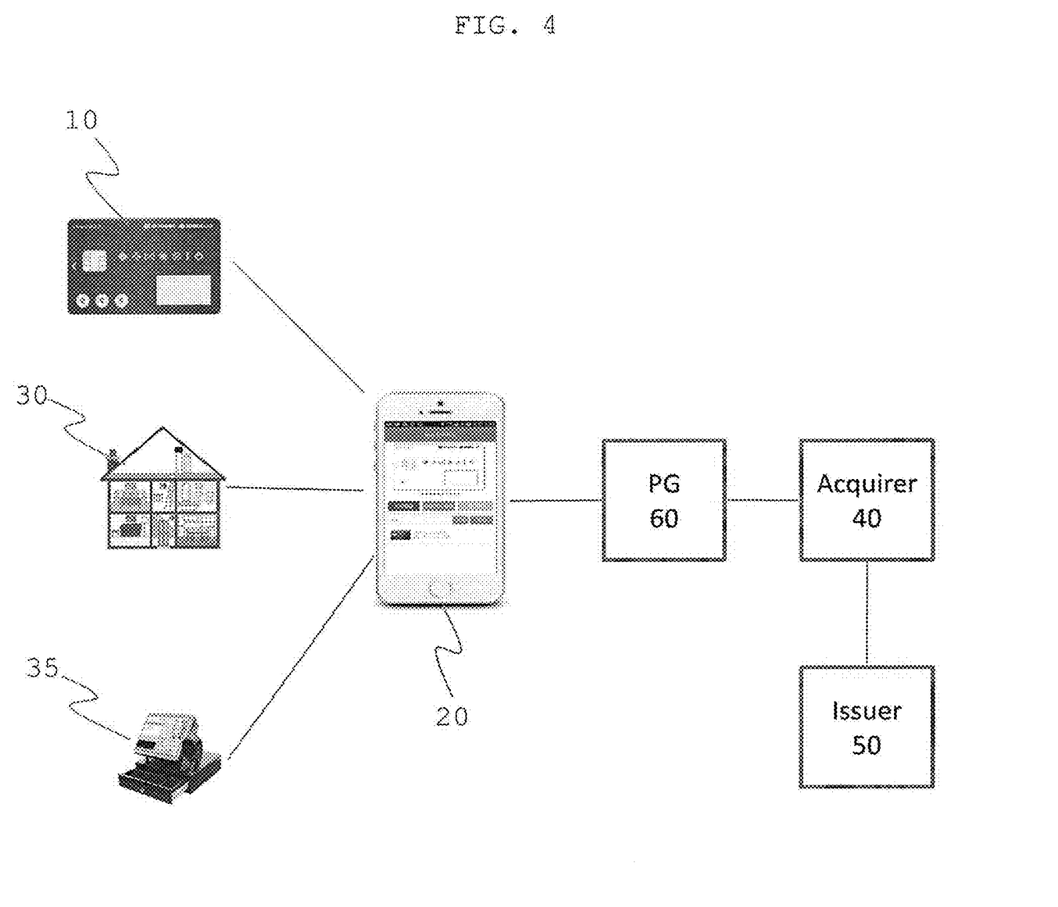
FIG. 4 is another schematic illustration of the card payment transaction using customer's mobile device and card according to the present invention.
Figure 5:
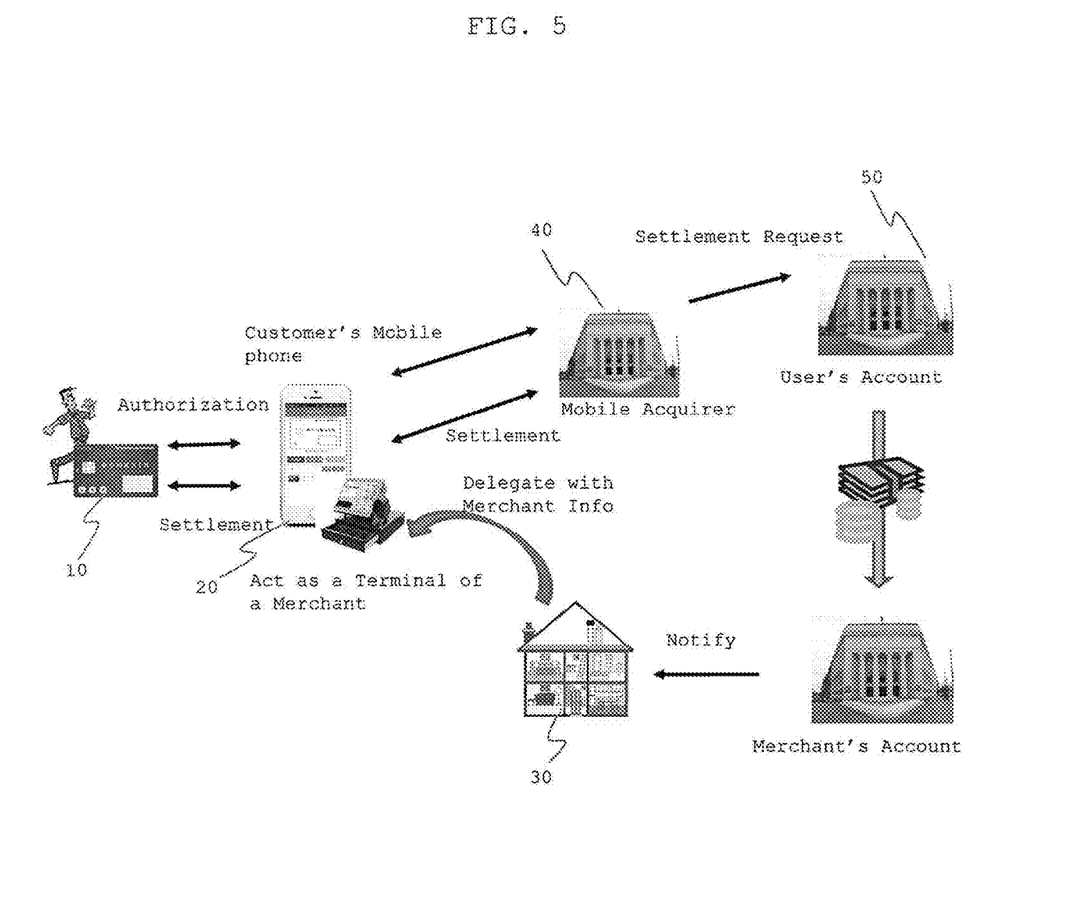
FIG. 5 is still another schematic illustration of the card payment transaction using customer's mobile device and card according to the present invention.

FIGS. 3, 4 and 5 illustrate the system for a customer initiated payment system using customer's card 10 and mobile device 20 according to the present invention.

The system for a customer initiated payment transaction includes a mobile device 20 of a customer; a card 10 of the customer having card information; and a merchant having merchant information and payment information. The merchant information may include a merchant code and the merchant's POS or other terminal parameter, and the payment information includes a payment amount, currency, or transaction number that the customer has to pay to purchase goods or services of the merchant.

The mobile device 10 may be a cellular phone, mobile phone, smart phone, tablet computing device, personal digital assistant (PDA), or the like. Here, the mobile device 10 also includes the application installed therein to implement the system of the present invention.

The acquirer 40 communicates with the issuer 60 as part of the approval process, where the issuer 60 is the entity that issued the card 10 to the consumer. Here, an acquirer 40 is usually a business entity such as a commercial bank that has a pre-existing business relationship with a merchant and an issuer 60 is usually a business entity such as a bank that issues a card 10 to a consumer. The approval of the payment transaction or clearance and settlement thereof may involve communication between the acquirer 40 and the issuer 60. The acquirer 40 and/or issuer 60 either approves or denies the payment transaction, and transfers such decision back to the mobile device 20. As in FIG. 4, the system may further include a payment gateway 60.

The mobile device 20 is operative to process a card payment transaction by the steps of, the mobile device 20: receiving the merchant information and the payment information; being activated, for processing the card payment transaction, by the card 10; creating a payment authorization request using the card information, the merchant information, and the payment information, and sending the payment authorization request to an acquirer 40; and receiving a result of the payment authorization request from the acquirer 40.

Here, the step of the mobile device 20 being activated includes not just activation for processing the card payment transaction but also authorization to use the card by the mobile device. Such activation, including authorization, may be accomplished in different ways: NFC or Bluetooth (Trademark) communication between the card and the mobile device, typing the card information into the mobile device 20, etc. Such activation may additionally include typing password or matching finger print or the likes.

Additionally, the step of the mobile device 20 being activated may be performed before the step of the mobile device 20 receiving the merchant information and the payment information.

The result of the payment authorization request may be approval or denial of the card payment, and such result is transmitted and displayed on the mobile device.

Figure 6:
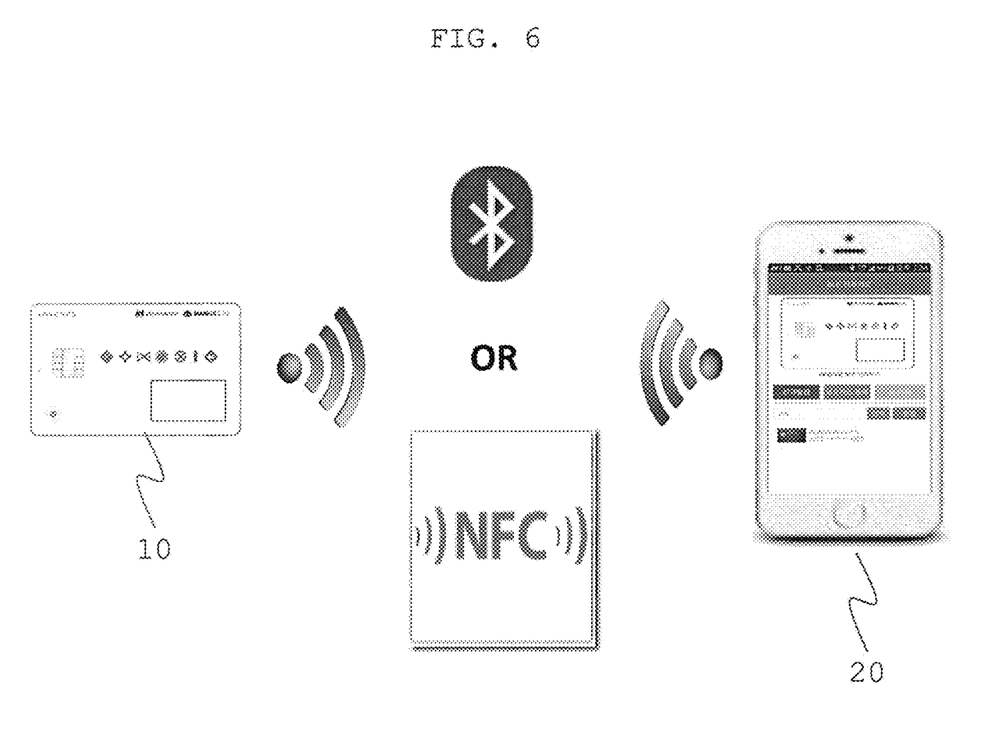
FIG. 6 shows communication methods between a card and a mobile device for a card payment transaction according to the present invention.

FIG. 6 shows the communication between the customer's card 10 and the customer's mobile device 20. Such communication is preferably by Bluetooth (Trademark) or near field communication. Or, the card information may be typed in the mobile device 20.

Preferably, the card 10 may be a multi-function device (MFD) or a near field communication (NFC) card having an antenna for near field communication (NFC), and the mobile device 20 may include an NFC sensor. The NFC card may have dual interface or may be a contactless card. The mobile device 20 may be activated for processing the card payment transaction via NFC between the card 10 and the mobile device 20, and the mobile device 20 may receive the card information from the card 10 via NFC between the card and the mobile device. In other words, by tapping the card 10 to the mobile device 20, the mobile device 20 is activated for processing a card payment transaction and receives the card information.

The card 10 may be the MFD card which stores information on a plurality of different cards, and the customer may select a card to be used for the card payment transaction from the list of the plurality of different cards using the MFD card. Alternatively, the card 10 may be the MFD card which stores information on a plurality of different cards, and the customer may select a card to be used for the card payment transaction from a list of the plurality of different cards using the mobile device. In other words, an MFD card can store a number of debit/credit cards and/or point cards together and a user can select which card to be used as a payment means. The MFD card may have a display such that the user can select a card from the list of cards displayed on the MFD card. Alternatively, such list may be transferred to the mobile device 20 and displayed on the screen of the mobile device 20 so that the user can select a card from the list.

The steps may further include the step of activating the card 10 such as the MFD card or NFC card via NFC or Bluetooth Light Energy (BLE) communication between the mobile device 20 and the card 10. For the BLE communication, the card 10 may have a BLE chip and the mobile device 20 may have a BLE antenna. Upon activation, the card can be used for payment transactions. U.S. patent application Ser. No. 15/605,808, entitled "Method for Activating Multi-Function Device Card", discloses method for activating the MFD card using the mobile device, the disclosure of which is incorporated herein in its entirety by reference.

The step of activating the card 10 may be performed before the step of the mobile device 20 receiving the merchant information and the payment information.

The method for activating an MFD card 10 by a mobile device 20 includes: switching on an NFC chip of the mobile device 20 to enable the mobile device 20 to wirelessly connect to the MFD card 10 via an NFC network; searching with the mobile device 20 in the NFC network for the MFD card 10 within a communicable range of the mobile device 20 by transmitting NFC signal from the mobile device 20 to the MFD card 10 to enable electromagnetic induction in an NFC antenna of the MFD card 10; launching on the mobile device 20 a preloaded application for initiating MFD card activation if the MFD card 10 is discovered via the NFC network; connecting the mobile device 20 to the MFD card 10 by a wireless personal area network (WPAN) using a WPAN antenna and WPAN chip of the MFD card 10 upon launching the preloaded application for initiating MFD card activation on the mobile device 20; mutually authenticating the MFD card 10 and the mobile device 20 through the WPAN by a predetermined method by the application; and when the MFD card 10 is authenticated, completing activation of the MFD card 10 for use. Preferably, the WPAN connection is a Bluetooth Low Energy (BLE) connection enabled by a BLE antenna and a BLE chip of the MFD card 10 and corresponding BLE antenna and BLE chip of the mobile device 20. Since the card 10 is activated by the mobile device 20, even if it is lost, it cannot be used for payment transactions without the mobile device 20.

The step of the mobile device 20 being activated includes transferring a chip serial number or a card serial number of the card 10 from the card 10 to the mobile device 20, and the mobile device 20 is activated for processing the card payment transaction if or only if the transferred chip serial number or the transferred card serial number matches the chip serial number or the card serial number stored in the mobile device 20.

The steps may further include a step of the mobile device receiving the card information. The card information may be received via NFC or Bluetooth communication or typed into the mobile device 20.

For security reasons, the card number or the card information is not stored in the mobile device 20 before the step of the mobile device 20 being activated. Furthermore, the steps further include the step of the mobile device 20 deleting the card information after sending the payment authorization request to the acquirer 40.

The steps may further include the step of the mobile device 20 creating and sending a clearance and settlement request to the acquirer 40. In other words, the mobile device 20 sends two requests: the payment authorization request and the clearance and settlement request. By these two separate requests, customers can have better control over the merchant's production of the goods or services.

Figure 7:
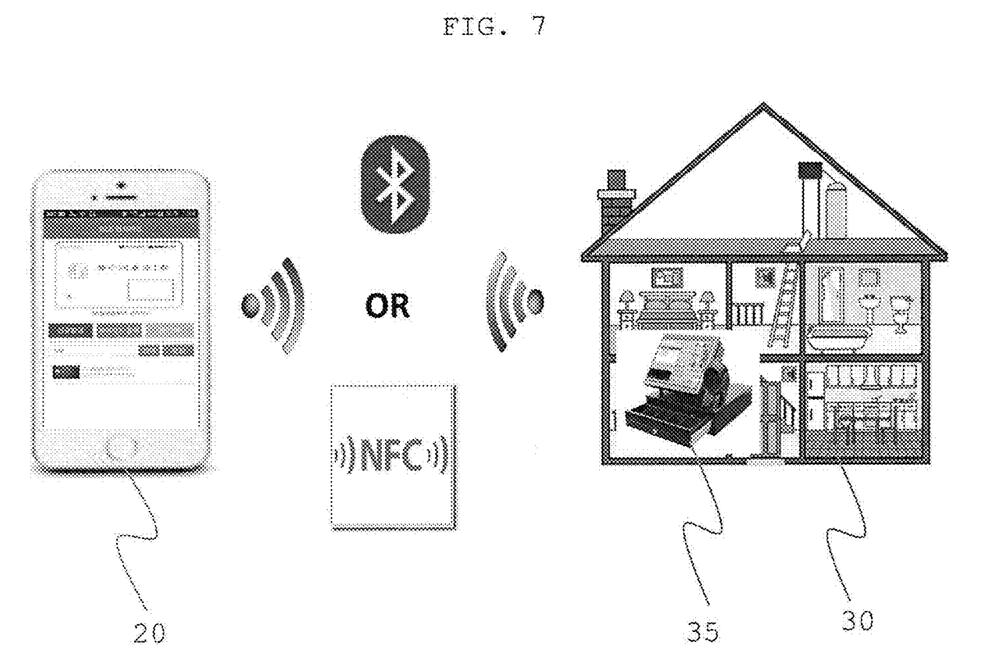
FIG. 7 shows communication methods between a card and a merchant or its BOS terminal for the card payment transaction according to the present invention.

FIG. 7 illustrates the communication between the mobile device 20 and the merchant 30 or its POS terminal 35.

The mobile device 20 may receive the merchant information from the merchant by: wireless communication from the merchant; tapping the mobile device 20 to an NFC tag or RFID tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant information.

In the alternative embodiment, the system may further comprise a server having a database which stores the merchant information. The mobile device 20 may obtain geolocation data of the merchant using a global positioning sensor (GPS) of the mobile device 20 and sends the geolocation data to the server, and in response, the server searches for and retrieves the merchant information corresponding to the geolocation data and sends the merchant information back to the mobile device 20.

In one embodiment, the system may utilize a proprietary portal database to retrieve the merchant information. The customer can retrieve detailed merchant information using the proprietary system, using for example GPS location of the merchant's place of business. The database may be updated from information gathered from participant users. The mobile device 20 may send the GPS location of the merchant and receive the merchant information from the proprietary merchant information provision system, or the mobile device 20 may send the GPS location or the merchant ID to the proprietary merchant information provision system and the proprietary merchant information provision system may send the merchant information back to the mobile device 20.

Besides, the mobile device 20 may receive the payment information from the merchant by: wireless communication from the merchant; tapping the mobile device to an NFC tag or RFID tag of the merchant which stores the payment information; or typing the payment information to the mobile device 20 either by the customer or the merchant. Additionally, SMS, beacon, infrared communication may be used. Alternatively, the merchant may use QR code or bar code to store and transmit the payment information.

The steps may further include a step of the acquirer 40 sending the result of the payment authorization request to the merchant via short message service (SMS), email, push message to the merchant terminal, etc.

Figure 8:
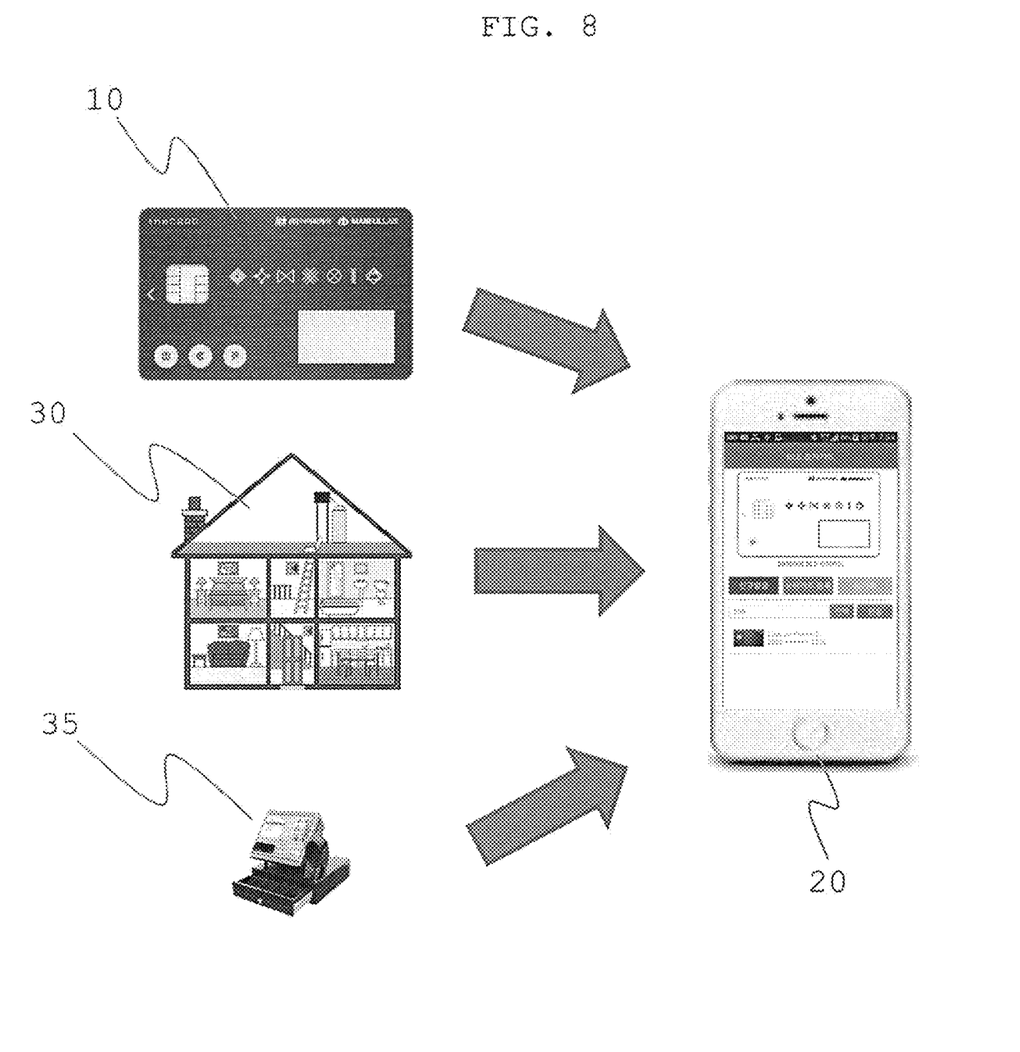
FIG. 8 shows a communication between customer's mobile device and a card, a merchant or the merchant's POS terminal according to the present invention.

As shown in FIG. 8, the mobile device 20 communicates with the card 10, the merchant 30, or the merchant's POS terminal, and plays the role of customer's own POS terminal.

FIGS. 3, 4 and 5 illustrate the system, for a customer initiated payment system using customer's card 10 and mobile device 20 according to the present invention. The card 10 may be debit/credit card, but it can be point card as well. U.S. patent application Ser. No. 15/679,072, entitled "System and Method for Integrated Management of Loyalty Points", discloses a method to convert non-integrated loyalty points to integrated loyalty points, the disclosure of which is incorporated herein in its entirety by reference.

The system for a customer initiated payment transaction according to the present invention includes: a mobile device 20 of a customer; a card 10 of the customer having information on integrated loyalty points; and a merchant who subscribes to accept integrated loyalty points as a payment method. The merchant has merchant information and payment information, and the information on the integrated loyalty points includes customer identification and the amount of the integrated loyalty points owned by the customer. The merchant information includes a merchant code and the payment information includes a payment amount.

The mobile device 20 is operative to process a payment transaction using the integrated loyalty points of the customer by the steps of, the mobile device 20: receiving the merchant information and the payment information, for instance, from the merchant; being activated, for processing the payment transaction, by the card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40.

The system may further include an integrated management server for managing the integrated loyalty points.

Preferably, the card 10 may be a multi-function device (MFD) card or a near field communication (NFC) card having an antenna for near field communication (NFC), and the mobile device 20 may include an NFC sensor. The mobile device 20 may be activated for processing the payment transact ion via NFC between the card 10 and the mobile device 20, and the mobile device 20 may receive the information on the integrated loyalty points from the card 10 via NFC between the card 10 and the mobile device 20.

For better security, the information on the integrated loyalty points may not be stored in the mobile device 20 before the step of the mobile device 20 being activated. In addition, the steps may further include the step of the mobile device 20 deleting the information on the integrated loyalty points after sending the payment authorization request to the acquirer 40.

The mobile device 20 may receive the merchant information and/or the payment information from the merchant by: wireless communication from the merchant; tapping the mobile device 20 to an NFC tag of the merchant which stores the merchant information; or typing the merchant information to the mobile device 20 either by the customer or the merchant. Additionally, SMS, beacon, infrared communication may be used. Alternatively, the merchant may use QR code or bar code to store and transmit the merchant or payment information.

The steps may further include a step of the acquirer 40 sending the result of the payment authorization request to the merchant via SMS, email, push message to the merchant terminal, etc.

In still another embodiment, a method for a customer Initiated payment transaction using the customer's card 10 is disclosed. The method Includes the steps of customer's mobile device 20: receiving the merchant information and the payment information, for instance, from the merchant; being activated, for processing a card payment transaction, by customer's card 10; creating a payment authorization request using card information, the merchant information, and the payment information, and sending the payment authorization request to an acquirer 40; and receiving a result of the payment authorization request from the acquirer 40. The method further includes the step of the mobile device deleting the card information after sending the payment authorization request to the acquirer 40.

In still another embodiment, a method for a customer initiated payment transaction using the customer's integrated loyalty points, which are stored in the customer's card 10, is disclosed. The method includes the steps of the customer's mobile device 20: receiving the merchant information and the payment information, for instance, from the merchant; being activated, for processing the payment transaction, by the customer's card 10; creating a payment authorization request using the information on the integrated loyalty points, the merchant information, and the payment information, and sending the payment authorization request to an acquirer 40 for the integrated loyalty points; and receiving a result of the payment authorization request from the acquirer 40. The method further includes the step of the mobile device 20 deleting the information on the integrated loyalty points after sending the payment authorization request to the acquirer 40.

Under the typical purchase situations using the system of the present invention, a customer: enters a merchant's place of business and purchases goods or services of the merchant. The customer's mobile device 20 receives the merchant information and the payment information. The customer may activate his MFD card or NFC card 10 via BLE or NFC by tapping it to his mobile device 20, and then the customer may select one of the stored payment methods—credit/debit cards or (integrated or non-integrated loyalty) point cards—from the screen of the mobile device 20. Then, the mobile device 20 creates and sends a payment authorization request to an acquirer, and then the acquirer sends the authorization result back to the mobile device 20 and the merchant.

The system of the present invention may be additionally used for escrow situations. The customer may separate the payment process into two: sending a payment authorization request to an acquirer and sending a clearance and settlement request to an acquirer. Between the two steps, the customer can monitor and make sure whether the merchant fulfills certain requirements or obligations.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A system for a customer initiated payment transaction, comprising:
   a mobile device of a customer;
   a card of the customer having card information;
      a merchant device having merchant information and payment information; and
   a server having a database which stores the merchant information,
wherein the merchant information includes a merchant code and the payment information includes a payment amount,
wherein the mobile device is operative to process a card payment transaction by the steps of:
   receiving the merchant information and the payment information;
   activating the mobile device, for processing the card payment transaction, by the card;
   creating a payment authorization request using the card information, the merchant information, and the payment information, and sending the payment authorization request to an acquirer affiliated with the customer;
   deleting the card information from the mobile device after sending the payment authorization request; and
   receiving a result of the payment authorization request from the acquirer,
   wherein the card is a multi-function device (MFD) card or a near field communication (NFC) card having an antenna for near field communication (NFC), and the mobile device includes an NFC sensor,
   wherein the mobile device is activated for processing the card payment transaction via NFC between the card and the mobile device, and wherein the mobile device receives the card information from the card via NFC between the card and the mobile device,
   wherein the step of activating the mobile device, for processing the card payment transaction, by the card includes transferring a chip serial number or a card serial number of the card from the card to the mobile device via NFC or Bluetooth Light Energy (BLE) communication such that the mobile device only becomes activated for processing the card payment if the chip serial number or the card serial number matches a chip serial number or a card serial number stored in the mobile device,
   wherein the card information from the card of the customer is not transferred to the merchant, and
   wherein the mobile device obtains geolocation data of the merchant device using a global positioning sensor of the mobile device and sends the geolocation data to the server, and in response, the server searches for and retrieves the merchant information corresponding to the geolocation data and sends the merchant information to the mobile device.

2. The system of claim 1, wherein the card is the MFD card which stores information on a plurality of different cards, and the customer can select a card to be used for the card payment transaction from a list of the plurality of different cards using the MFD card.

3. The system of claim 1, wherein the card is the MFD card which stores information on a plurality of different cards, and the customer can select a card to be used for the card payment transaction from a list of the plurality of different cards using the mobile device.

4. The system of claim 1, wherein the mobile device includes receiving the card information.

5. The system of claim 1, wherein the card information includes a card number and the card number is not stored in the mobile device before the step of the mobile device being activated.

6. The system of claim 1, wherein the process includes creating and sending a clearance and settlement request to the acquirer.

7. The system of claim 1, wherein the mobile device receives the merchant information by:
   wireless communication from the merchant;
   tapping the mobile device to an NFC tag or an RFID tag of the merchant which stores the merchant information; or
   typing the merchant information to the mobile device.

8. The system of claim 1, wherein the mobile device receives the payment information by:
   wireless communication from the merchant;
   tapping the mobile device to an NFC tag or an RFID tag of the merchant which stores the payment information; or
   typing the payment information to the mobile device.

9. The system of claim 1, wherein the acquirer sends the result of the payment authorization request to the merchant.

10. The system of claim 1, wherein the steps further include a step of the acquirer sending the result of the payment authorization request to the merchant.

11. A system for a customer initiated payment transaction, comprising:
   a mobile device of a customer;
   a card of the customer having information on integrated loyalty points;
   a merchant device subscribed to accept integrated loyalty points as a payment method wherein the merchant has merchant information and payment information; and
   a server having a database which stores the merchant information,
wherein the information on the integrated loyalty points includes customer identification and the amount of the integrated loyalty points owned by the customer,
wherein the merchant information includes a merchant code and the payment information includes a payment amount,
wherein the mobile device is operative to process a payment transaction using the integrated loyalty points of the customer by the steps of:
   receiving the merchant information and the payment information;
   activating the mobile device, for processing the payment transaction, by the card;
   creating a payment authorization request using the information on the integrated loyalty points, the merchant information, and the payment information, and sending the payment authorization request to an acquirer affiliated with the customer for the integrated loyalty points; and
   receiving a result of the payment authorization request from the acquirer,
   wherein the card is a multi-function device (MFD) card or a near field communication (NFC) card having an antenna for near field communication (NFC), and the mobile device includes an NFC sensor,
   wherein the mobile device is activated for processing the payment transaction via NFC between the card and the mobile device, and wherein the mobile device receives the information on the integrated loyalty points from the card via NFC between the card and the mobile device, wherein the step of activating the mobile device, for processing the payment transaction, by the card includes transferring a chip serial number or a card serial number of the card from the card to the mobile device via NFC or Bluetooth Light Energy (BLE) such that the mobile device only becomes activated for processing the card payment if the chip serial number or the card serial number matches a chip serial number or a card serial number stored in the mobile device, wherein the card information is deleted from the mobile device after the transaction, wherein the card information from the card of the customer is not transferred to the merchant, and wherein the mobile device obtains geolocation data of the merchant device using a global positioning sensor of the mobile device and sends the geolocation data to the server, and in response, the server searches for and retrieves the merchant information corresponding to the geolocation data and sends the merchant information to the mobile device.

12. The system of claim 11, wherein the information on the integrated loyalty points is not stored in the mobile device before the step of the mobile device being activated.

13. The system of claim 11, wherein the mobile device receives the merchant information and the payment information by:
  wireless communication from the merchant;
  tapping the mobile device to an NFC tag or an RFID tag of the merchant which stores the merchant information; or
  typing the merchant information to the mobile device.

* * * * *